United States Patent
Lee et al.

(10) Patent No.: US 10,296,006 B2
(45) Date of Patent: May 21, 2019

(54) COMPUTER VISION POSITIONING SYSTEM AND METHOD FOR THE SAME

(71) Applicant: SCIENBIZIP CONSULTING (SHENZHEN) CO., LTD., Shenzhen (CN)

(72) Inventors: Horng-Juing Lee, New Taipei (TW); Tien-Ping Liu, New Taipei (TW); Shu-Fen Chen, New Taipei (TW); Yu-Chien Hsiao, New Taipei (TW)

(73) Assignee: ScienBiziP Consulting (Shenzhen) Co., Ltd., Shenzhen (CN)

(*) Notice: Subject to any disclaimer, the term of this patent is extended or adjusted under 35 U.S.C. 154(b) by 20 days.

(21) Appl. No.: 15/279,961

(22) Filed: Sep. 29, 2016

(65) Prior Publication Data

US 2017/0212521 A1    Jul. 27, 2017

(30) Foreign Application Priority Data

Jan. 27, 2016    (TW) .................. 105102451

(51) Int. Cl.
*G05D 1/02*    (2006.01)
*G06K 19/06*    (2006.01)

(52) U.S. Cl.
CPC ..... *G05D 1/0234* (2013.01); *G06K 19/06037* (2013.01)

(58) Field of Classification Search
CPC .................. G05D 1/0234; G01C 21/00; G06K 19/06037; G06K 7/00; G06K 7/10722; G06K 7/1417
See application file for complete search history.

(56) References Cited

U.S. PATENT DOCUMENTS

| | | | | |
|---|---|---|---|---|
| 7,155,316 B2* | 12/2006 | Sutherland | ............ | A61B 90/25 700/248 |
| 7,651,850 B2* | 1/2010 | Meiring | .................. | G06K 7/14 427/10 |
| 8,017,174 B2* | 9/2011 | Meiring | .................. | G06K 7/14 427/2.11 |
| 9,031,809 B1* | 5/2015 | Kumar | ................ | G01C 21/165 702/150 |
| 9,286,810 B2* | 3/2016 | Eade | ................... | G09B 29/007 |
| 9,427,874 B1* | 8/2016 | Rublee | .................. | B25J 9/1697 |
| 9,665,095 B1* | 5/2017 | Romano | ............. | G05D 1/0038 |
| 9,669,926 B2* | 6/2017 | Levien | ................. | B64C 39/024 |

(Continued)

OTHER PUBLICATIONS

AprilTag: A robust and flexible visual fiducial system, pp. 3400-3407, Author: Edwin Olson Proceedings of the IEEE International Conference on Robotics and Automation (ICRA), Published: May 2011 https://april.eecs.umich.edu/media/pdfs/olson2011tags.pdf.*

*Primary Examiner* — Thomas E Worden
(74) *Attorney, Agent, or Firm* — ScienBiziP, P.C.

(57) ABSTRACT

An artificial marker combination to be read by an autonomous mobile device comprises at least two artificial markers arranged in order. Each artificial marker is different and the artificial marker combination is used as a group of artificial markers. A computer vision positioning system used in connection with the artificial marker combination utilizes the individual meanings in the multiple markers as instructions for the mobile device markers along its route. A method for the computer vision positioning system is also provided.

1 Claim, 5 Drawing Sheets

(56) References Cited

U.S. PATENT DOCUMENTS

| | | | | |
|---|---|---|---|---|
| 9,803,975 B2* | 10/2017 | Moed | | G01B 11/06 |
| 9,857,799 B2* | 1/2018 | Liu | | G05D 1/0234 |
| 2005/0228555 A1* | 10/2005 | Roh | | G05D 1/0234 |
| | | | | 701/25 |
| 2006/0098851 A1* | 5/2006 | Shoham et al. | ... | A61B 17/1703 |
| | | | | 382/128 |
| 2009/0177081 A1* | 7/2009 | Joskowicz | | A61B 90/13 |
| | | | | 600/426 |
| 2010/0215216 A1* | 8/2010 | Hong | | G06K 9/3216 |
| | | | | 382/103 |
| 2011/0256800 A1* | 10/2011 | Jennings | | G01S 1/70 |
| | | | | 446/456 |
| 2012/0261474 A1* | 10/2012 | Kawashinne | | G02B 3/14 |
| | | | | 235/462.24 |
| 2014/0021259 A1* | 1/2014 | Moed | | G06K 9/2027 |
| | | | | 235/472.01 |
| 2014/0100693 A1* | 4/2014 | Fong et al. | | G05D 1/0274 |
| | | | | 700/253 |
| 2015/0203213 A1* | 7/2015 | Levien | | G01C 21/00 |
| | | | | 701/486 |
| 2016/0296293 A1* | 10/2016 | Gill | | A61B 34/30 |
| 2016/0299233 A1* | 10/2016 | Levien | | G01C 21/00 |
| 2017/0029213 A1* | 2/2017 | Johnson | | B65G 1/1378 |
| 2017/0054965 A1* | 2/2017 | Raab | | G01C 11/02 |
| 2017/0212520 A1* | 7/2017 | Liu | | G05D 1/0234 |
| 2018/0039279 A1* | 2/2018 | Lee | | G05D 1/0246 |
| 2018/0039280 A1* | 2/2018 | Lee | | B60R 11/04 |

* cited by examiner

FIG. 3 providing an artificial marker combination, the artificial marker combination comprises at least two artificial markers. The artificial marker combination is applied within a region which needs to be marked; wherein one artificial marker of the artificial marker combination comprises the location information, and other artificial markers except the one artificial marker of the artificial marker combination comprise the disposal information. The artificial marker comprising the location information being defined as a fourth artificial marker, and other artificial markers comprising the disposal information being defined as fifth artificial markers providing and releasing an autonomous mobile device including the computer vision positioning system, wherein the image collection module collects the images of the artificial marker combination, and transmits the images to the artificial marker identification module. The artificial marker identification module identifies the individual images of the artificial marker combination, and transmits the ID of each artificial marker to the data storage module. The data storage module can determine the location of the autonomous mobile device according to the ID of the fourth artificial marker, and the data storage module stores the disposal information according to the ID of the fifth artificial markers. The control module can control the autonomous mobile device to move and make a disposal according to data in the data storage module

COMPUTER VISION POSITIONING SYSTEM AND METHOD FOR THE SAME

CROSS-REFERENCE TO RELATED APPLICATIONS

This application claims all benefits accruing under 35 U.S.C. § 119 from TW Patent Application No. 105102451, filed on Jan. 27, 2016 in the TW Intellectual Property Office, and China Patent Application No. 201610054208.0, filed on Jan. 27, 2016 in the China Intellectual Property Office, the contents of which are hereby incorporated by reference.

FIELD

The subject matter herein generally relates to a computer vision positioning system and method for the same.

BACKGROUND

In visual artificial marking positioning systems, calibrated lenses are used to shoot pictures of artificial markers with fixed size and format, in order to determine a location of an autonomous mobile device. The relative position and angle of the autonomous mobile device relative to the artificial markers can also be determined. However, the number of resoluble artificial markers is limited by formats of the artificial markers, for example, 16h5 mark series has 30 members, but 36h11 mark series has 586 members; 16h5 mark series covers only 900 points, but 36h11 mark series can cover 343396 points. Therefore, an application of the visual artificial marking positioning systems in a wide area is restricted, in that there are not enough artificial markers to be used in a large-scale map.

In addition, currently, a location of the autonomous mobile device, and the relative position and angle of the autonomous mobile device with the artificial markers are determined by one artificial marker. However, location information and disposal information of the autonomous mobile device cannot be obtained by only one artificial marker.

BRIEF DESCRIPTION OF THE DRAWING

Implementations of the present technology will now be described, by way of example only, with reference to the attached figures, wherein.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

The present disclosure is described in relation to an artificial marker combination. The artificial marker combination comprises at least two artificial markers. The at least two artificial markers are different and arranged in order. The at least two artificial markers can be Tag36h11 marker series, Tag36h10 marker series, Tag25h9 marker series, or Tag16h5 marker series. The artificial marker combination can be used as a group of artificial markers, which means that the at least two artificial markers can be printed on a same page according to a certain order, and then the at least two artificial markers are automatically read through image input devices or photoelectric scanning equipment, in order to process information.

Figure 1:
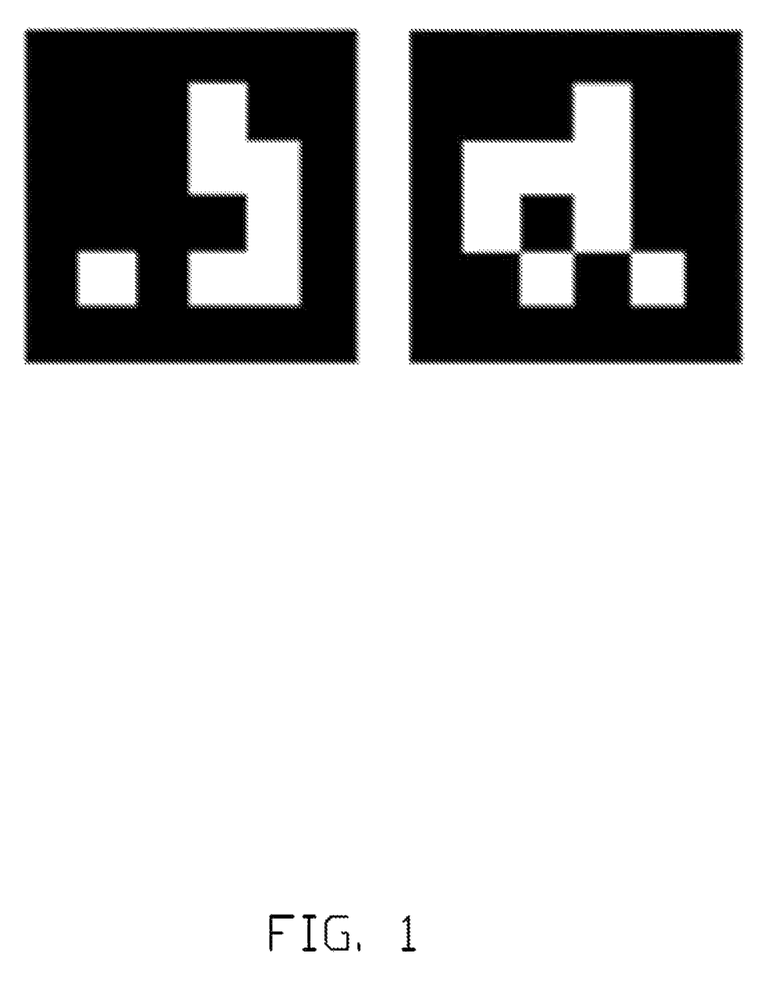
FIG. 1 is an artificial marker combination according to one embodiment.

Referring to FIG. 1, the artificial marker combination comprises two artificial markers. The two artificial markers can be selected from the Tag16h5 marker series, the two artificial markers being different.

Figure 2:
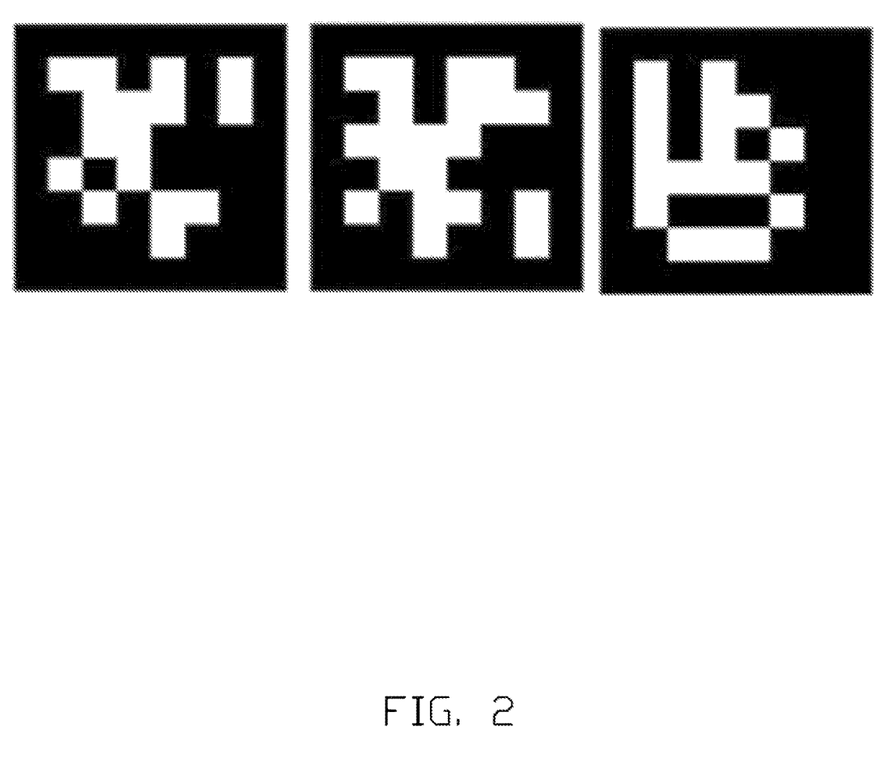
FIG. 2 is an artificial marker combination according to another embodiment.

Referring to FIG. 2, the artificial marker combination comprises three artificial markers. The three artificial markers can be selected from the Tag36h11 marker series, the three artificial markers being different.

Each artificial marker of the artificial marker combination can be selected from different marker series. In one embodiment, the artificial marker combination comprises three artificial markers. A first artificial marker is selected from the Tag36h11 marker series, a second artificial marker is selected from the Tag25h9 marker series, and a third marker is selected from the Tag16h5 marker series.

The artificial marker combination can also comprise four or more than four artificial markers.

If all the artificial markers of two artificial marker combinations are the same; but meanings of the artificial markers from the two artificial marker combinations are different, the two artificial marker combinations are regarded as different.

In one embodiment, the first artificial marker can be location information, the second artificial marker can be disposal information, and the third artificial marker can be other information. The number of the artificial markers of the artificial marker combination can be selected according to a function to be realized.

The number of the artificial markers can be increased without limitation, by combining two or more than two artificial markers, and calculating in combination through defining the Identity (ID) of the two or more than two artificial markers as bits. That is, the number of artificial markers which can be used is not limited.

Figure 3:
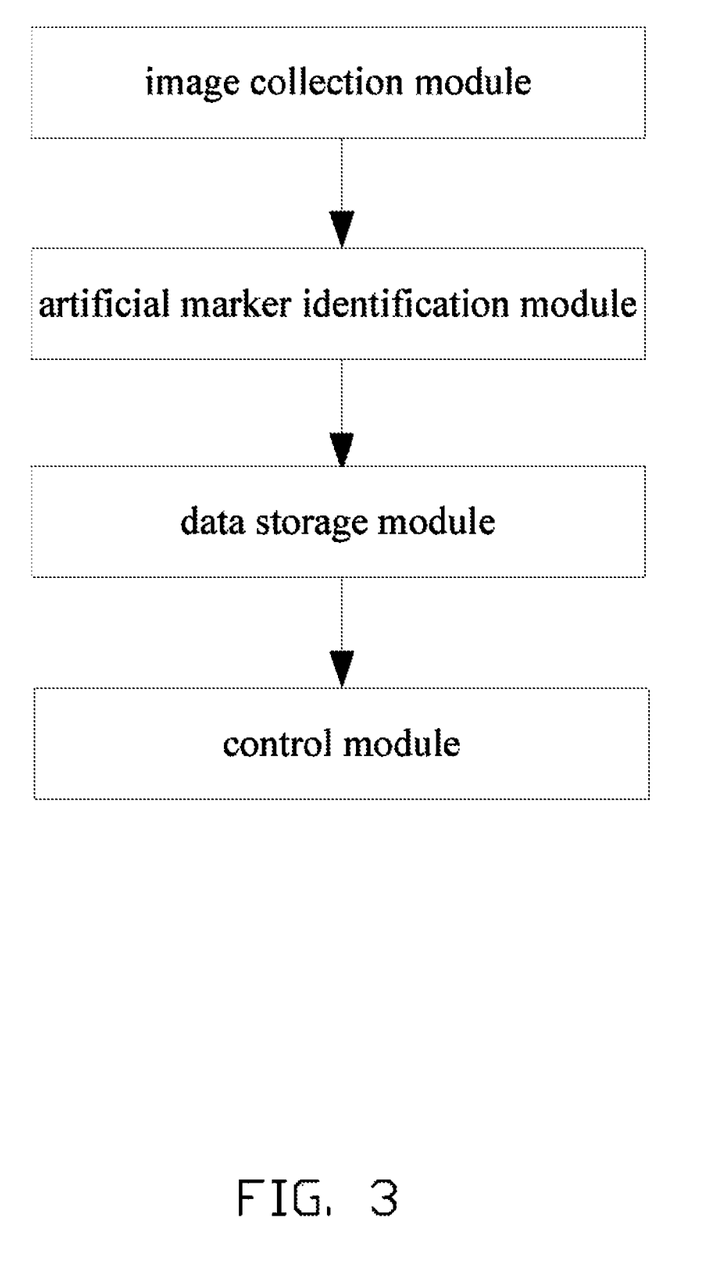
FIG. 3 is a block diagram of a computer vision positioning system according to one embodiment.

Referring to FIG. 3, the present disclosure is described in relation to a computer vision positioning system (CVPS) combining the artificial marker combination. The computer vision positioning system comprises an image collection module, an artificial marker identification module, a data storage module, and a control module.

The image collection module is used to collect images, and transmit the images to the artificial marker identification module. The image collection module comprises a camera. The camera comprises a Charge-coupled Device (CCD) or a Complementary Metal Oxide Semiconductor (CMOS) camera.

The artificial marker identification module seeks and determines which images are similar to the artificial marker. Images which are deemed similar to the artificial marker are defined as first images. The first images are marked and identified as being the same as the artificial markers or not the same. If the first images are identified as being identical to the artificial markers, the ID of the first images are read and transmitted to the data storage module. A distance and an angle between an autonomous mobile device and the artificial markers can be calculated by the artificial marker identification module, a location of the autonomous mobile device being thereby obtained. If the autonomous mobile device has not reached the artificial marker, the control module adjusts the autonomous mobile device to move into the artificial marker. If the autonomous mobile device has reached the mark marker, the control module controls the autonomous mobile device to remain stationary.

The data storage module stores a map and a map description file marked with the artificial markers. The artificial markers are posted on the map, to embed a specific location of each artificial marker into the map with a format which can be recognized by the autonomous mobile device. In one embodiment, the data storage module also stores related disposal information of the artificial markers.

The control module controls the autonomous mobile device to move and to make a disposal according to data in the data storage module. Wherein "make a disposal" includes the specific actions of the autonomous mobile device after the autonomous mobile device reached the artificial marker. For example, the control module controls the autonomous mobile device to extend a normal manipulator to use a clamp to take hold of an object; or the control module controls the autonomous mobile device to move on an upward-sloping route at a specific motor output.

Figure 4:
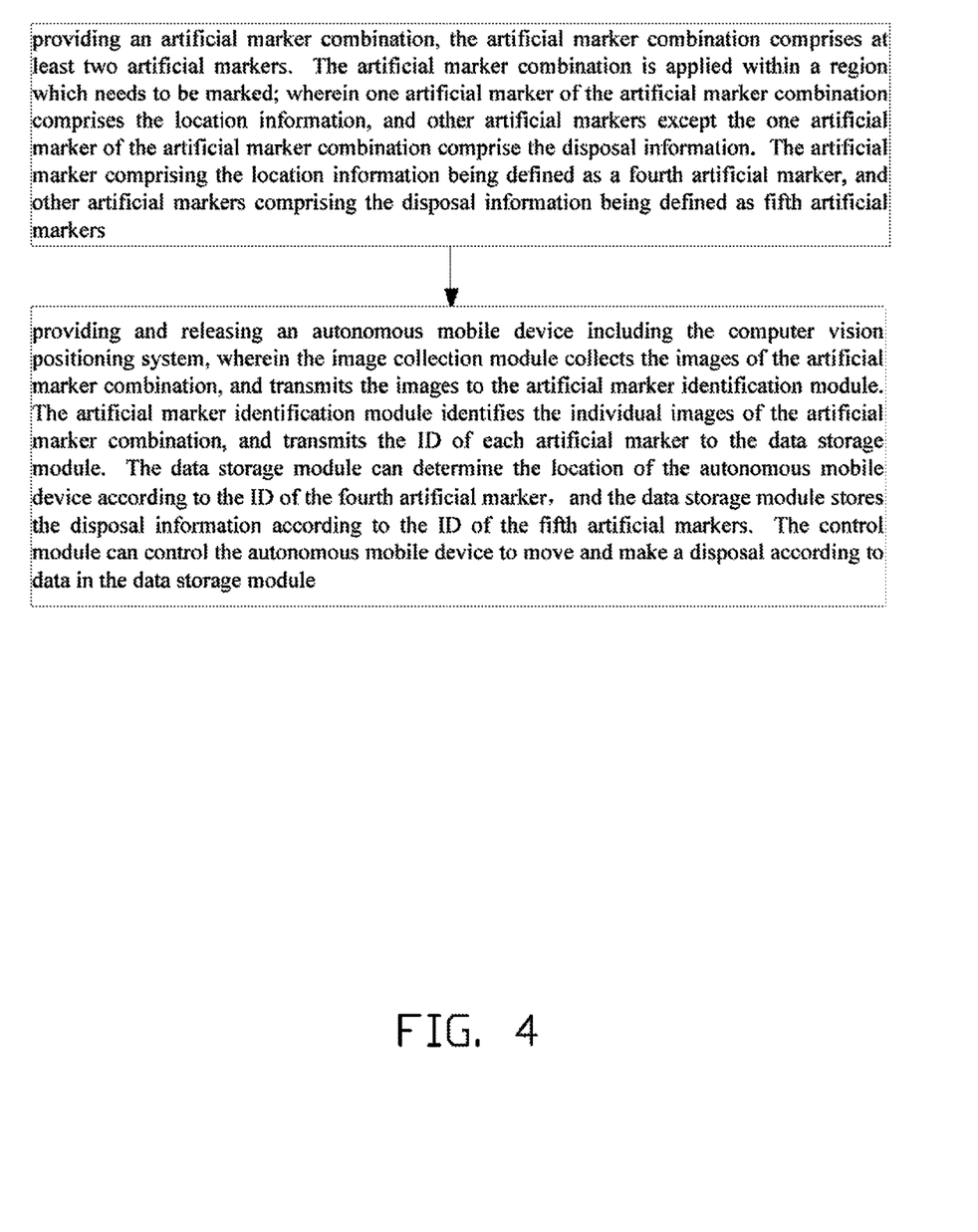
FIG. 4 is a flow chart of a computer vision positioning method according to one embodiment.
Figure 5:
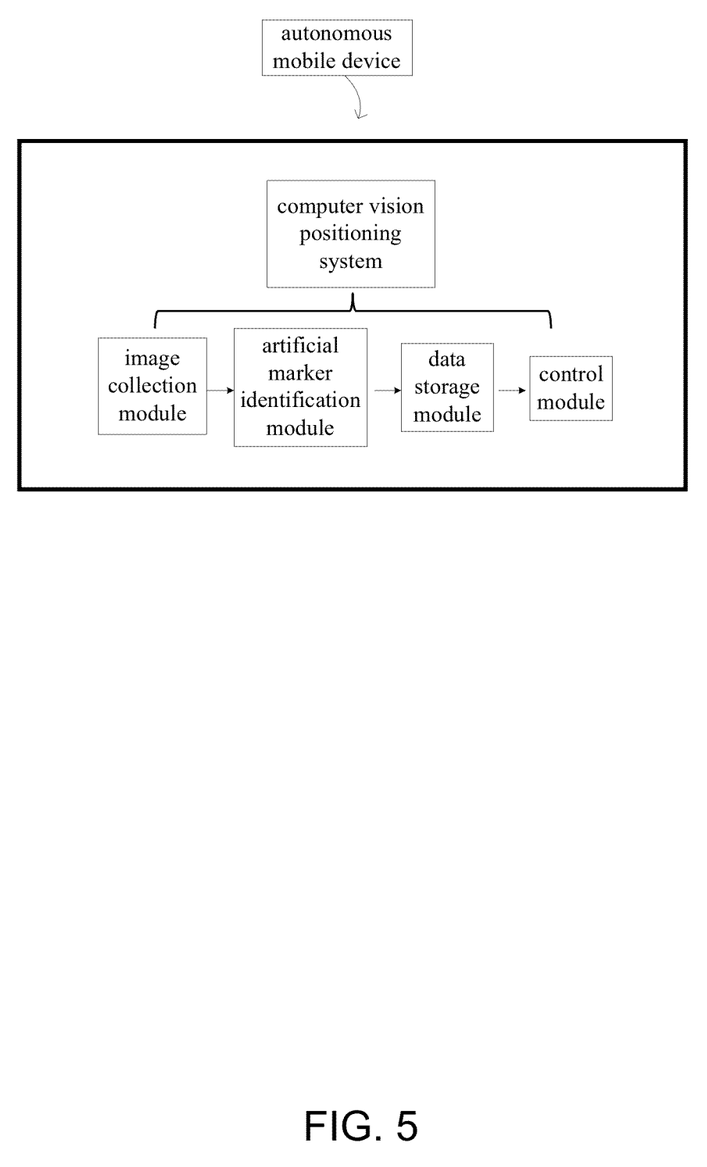
FIG. 5 is a block diagram of a autonomous mobile device according to one embodiment.

As shown in FIGS. 4-5, a positioning method of the computer vision positioning system in one embodiment comprises the following steps:

S1: providing an artificial marker combination, the artificial marker combination comprises at least two artificial markers. The artificial marker combination is applied within a region which needs to be marked; wherein one artificial marker of the artificial marker combination comprises the location information, and other artificial markers except the one artificial marker of the artificial marker combination comprise the disposal information. The artificial marker comprising the location information being defined as a fourth artificial marker, and other artificial markers comprising the disposal information being defined as fifth artificial markers;

S2: providing and releasing an autonomous mobile device including the computer vision positioning system, wherein the image collection module collects the images of the artificial marker combination, and transmits the images to the artificial marker identification module. The artificial marker identification module identifies the individual images of the artificial marker combination, and transmits the ID of each artificial marker to the data storage module. The data storage module can determine the location of the autonomous mobile device according to the ID of the fourth artificial marker, and the data storage module stores the disposal information according to the ID of the fifth artificial markers. The control module can control the autonomous mobile device to move and make a disposal according to data in the data storage module.

The artificial marker identification module determines which images are similar to the artificial marker. Images which are similar to the artificial marker are defined as first images. The first images are marked and identified as being identical to the artificial markers or not identical. If the first images are identified as the same as artificial markers, the ID of the first images are read and transmitted to the data storage module. A distance and an angle between an autonomous mobile device and the artificial markers can be calculated by the artificial marker identification module; thereby a location of the autonomous mobile device can be obtained. If the autonomous mobile device has not reached the artificial marker, the control module adjusts the autonomous mobile device to move into the artificial marker. If the autonomous mobile device has reached the mark marker, the control module controls the autonomous mobile device to remain stationary.

The autonomous mobile device can be any mobile device such as robot or unmanned vehicle.

Example 1

A robot with the above computer vision positioning system moves to a destination and picks up goods at the destination. The computer vision positioning system comprises the image collection module, the artificial marker identification module, the data storage module, and the control module.

In this example, the robot moves a machine which is on a shelf. An artificial marker combination is located above the shelf and above the machine. The artificial marker combination comprises an artificial marker "A" and an artificial marker "B". The artificial marker "A" comprises location information, and the artificial marker "B" comprises disposal information. In the data storage module, the artificial marker "A" and the artificial marker "B" are endowed with different meanings by an artificial writer. The artificial marker "A" represents a location of the machine on the shelf. The artificial marker "B" represents non-fragile goods able to be clamped and handled by a normal manipulator.

Firstly, the control module controls the robot to move to the proximity of the artificial mark "A," according to a route in the map description file.

Then, the image collection module collects images with the calibrated camera lens, and transmits the images to the artificial marker identification module. The images collected by the calibrated camera lens can have no distortion.

The artificial marker identification module identifies the artificial marker "A" and the artificial marker "B." The ID of the artificial marker "A" and the ID of the artificial marker "B" are read, and the ID of the artificial marker "A" and the ID of the artificial marker "B" are transmitted to the data storage module. The distance and angle between the robot and the artificial marker "A" are calculated by the artificial marker identification module, and the robot has reached the mark marker "A" is anti calculated.

The location information according to the ID of the artificial marker "A" is the location of the machine on the shelf. The disposal information according to the ID of the artificial marker "B" is that the machine is non-fragile goods able to be clamped and handled by a normal manipulator.

The control module controls the robot to extend a normal manipulator to use a clamp to take hold of the machine.

When the machine on the shelf is replaced, only the artificial marker "B" needs to be modified. Robot programs do not need to be edited or re-edited. Therefore, coding is flexible, it is not necessary to bind the location information and the relative disposal information together in a program. Processing is thus simplified.

In another example, each artificial marker of the artificial marker combination can represent other meanings. Different artificial markers can have different meanings, realized by an editing program.

Example 2

A route of a robot with the above computer vision positioning system may have different terrain to cross, but the robot using the computer vision positioning system herein disclosed can go on or through different terrains smoothly.

The different terrains comprise concrete, carpet, upward-sloping route, and downward-sloping path. Since a friction coefficient of the robot is different for different terrains, the motor output should be adjusted according to the different terrains. The robot dynamically adjusts the motor output by a method of combining relevant artificial markers, to go on or through different terrains smoothly.

The computer vision positioning system comprises the image collection module, the artificial marker identification module, the data storage module, and the control module.

The artificial marker combination is set at the starting point of a special route. One artificial marker of the artificial marker combination comprises the location information, and one artificial marker of the artificial marker combination comprises the disposal information. The artificial marker comprising location information indicates the starting point of the special route; and other artificial markers of the artificial marker combination indicate the type of the special route and the related disposal information. In this example, one artificial marker combination comprising an artificial marker "C" and artificial marker "D" is set at the starting point of an upward-sloping route. The artificial marker "C" represents the starting point of the special route. The artificial marker combination "D" signifies that the special route is an upward-sloping route and the robot can determine the output of the motor to progress forward on the upward-sloping route.

Firstly, the control module controls the robot to move to the proximity of the artificial mark "C" according to a route in the map description file. That is, the control module controls the robot to move to the starting point of the special route.

Then, the image collection module collects images with a calibrated camera lens, and transmits the images to the artificial marker identification module. The images collected by the calibrated camera lens can have no distortion.

The artificial marker identification module identifies the artificial marker "C" and the artificial mark "D." The ID of the artificial marker "C" and the ID of the artificial mark "D" is read, and the ID of the artificial marker "C" and the ID of the artificial mark "D" are transmitted to the data storage module. The distance and angle between the robot and the artificial marker "C" are calculated by the artificial marker identification module, and the location of the robot is anti calculated. The robot has not reached the mark marker "C", the control module make adjustments to the robot, to move it to the artificial marker "C".

The location information of the robot is obtained by the data storage module according to the ID of the artificial marker "C". The location information according to the ID of the artificial marker "C" is the starting point of the special route. The data storage module also stores the ID of the artificial marker "D". The ID of the artificial marker "D" indicates that the special route is upward-sloping, and the robot can determine the output of the motor to progress forward on the upward-sloping route.

The control module controls the robot to move on the upward-sloping route at a specific motor output, in order to make the progress of the robot smooth.

Since the disposal information according to other artificial markers "D" is stored in the data storage module. When the robot moves on other special routes, the robot can do an appropriate disposal only by replacing the artificial marker "D". The robot program does not need to be re-edited. This coding is therefore flexible, binding the location information and the relative disposal information together in a program is avoided, which simplifies the processing.

In another example, each artificial marker of the artificial marker combination can represent other meanings.

For the computer vision positioning system, the location of the autonomous mobile device can be obtained by one artificial marker of the artificial marker combination. The disposal information of the autonomous mobile device at the location can also be obtained by other artificial markers of the artificial marker combination. When the disposal information of the autonomous mobile device is changed, the autonomous mobile device can do an appropriate disposal only by replacing the artificial markers of the artificial marker combination. The autonomous mobile device program does not need to be re-edited. This coding is therefore flexible, binding the location information and the relative disposal information together in a program is avoided, which simplifies the processing.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

The above-described embodiments are intended to illustrate rather than to limit the disclosure. Variations may be made to the embodiments without departing from the spirit of the disclosure as claimed. Elements associated with any of the above embodiments are envisioned to be associated with any other embodiments. The above-described embodiments illustrate the scope of the disclosure but do not restrict the scope of the disclosure.

What is claimed is:

1. A positioning method of a computer vision positioning system (CVPS), comprising:
provided an artificial marker combination, the artificial marker combination comprises a plurality of artificial markers, applying the artificial marker combination within a region which needs to be marked, wherein a first artificial marker of the plurality of artificial markers comprises a location information, and the location information corresponds to a first Identity (ID) of the first artificial marker; and second artificial markers of the plurality of artificial markers comprise disposal information, and each disposal information corresponds to a second ID of each second artificial markers;

providing and releasing an autonomous mobile device having the computer vision positioning system; wherein the CVPS comprises an image collection module, an artificial marker identification module, a data storage module, and a control module, each of the artificial marker identification module, the data storage module, and the control module is a processor;

collecting images and transmitting the images of an unknown artificial marker combination to the artificial marker identification module;

identifying the images of the artificial marker combination, reading a third ID of each of a plurality of unknown artificial markers of the unknown artificial marker combination and transmitting the third ID to the data storage module directly by the artificial marker identification module, wherein a map and a map description file marked with artificial markers, the location information, and the disposal information are stored in the data storage module; and selecting the location information by comparing the third ID to the first ID and selecting the disposal information from the data storage module by comparing the third ID to the second ID; and controlling the autonomous mobile device to move to the first artificial marker by the control module according to the location information to make a distance and an angle between the autonomous mobile device and the first artificial marker equal to zero, and controlling the autonomous mobile device to make a disposal according to the disposal information by the control module.

* * * * *